United States Patent Office 3,838,003
Patented Sept. 24, 1974

3,838,003
PROCESSES FOR THE CULTIVATION OF FUNGI
Pol Joseph Ghislain Lhoas, London, England, assignor to Beecham Group Limited, Brentford, Middlesex, England
No Drawing. Filed Jan. 12, 1973, Ser. No. 323,221
Int. Cl. C12k 7/00
U.S. Cl. 195—1.1                    4 Claims

ABSTRACT OF THE DISCLOSURE

Fungus infected with a double-stranded ribonucleic acid virus is prepared by contacting fungal cells of opposite mating types or opposite gametes with double-stranded ribonucleic acid virus particles of fungal origin to infect at least some of the resultant zygotes, with the virus particles and cultivating the infected zygotes to produce the virus infected fungus.

---

This invention relates to a method for the large scale preparation of virus particles in host fungi.

It is now known that double-stranded ribonucleic acids and their salts (herein collectively referred to as d.s. RNA) are potent inducers of interferons and are thus of value in the broad spectrum prophylaxis of viral infections, and, to a lesser extent, in the treatment of such infections. D.s. RNA of both synthetic and natural origin has been shown to possess interferon-inducing activity. Among the specific sources of interferon-inducing natural d.s. RNA which have been reported are the virus particles found in some strains of *Penicillium chrysogenum, P. funiculosum* and *P. stoloniferum*. We have also found d.s. RNA viruses in other fungal species, including some strains of *Aspergillus niger* and *A. foetidus*.

In growing virus-infected fungi for the subsequent isolation of viral d.s. RNA it has usually been necessary to find the fungi in nature already infected with virus and the yield of d.s. RNA virus particles obtained after cultivation depends directly on the particular host fungus/virus combination found. If it were possible deliberately to infect previously virus-free fungi with virus as required, then the most appropriate host strain could be chosen for producing the best results, for example highest yields, purest preparations and the like. In addition, if a particular viral d.s. RNA species were preferred as an interferon inducer, it would be possible to infect the most appropriate host fungus and reap high yields of the desired virus without an initial long and highly uncertain search for a strain of the host fungus already infected with the desired virus. P. Lhoas (*Nature, 230,* 248 (1971)) has described a method of achieving infection of a previously uninfected fungus through hyphal anastomoses, but the method is very limited and is of little value for the commercial-scale production of virus particles. A more versatile technique is described in our Belgian Pat. No. 780,226, where infection is achieved in protoplasts of the host fungus, which are then grown to produce infected fungal colonies.

The present invention is based on the discovery of another method of infecting previously virus-free fungi with virus particles containing d.s. RNA.

According to the present invention there is provided a process for the preparation of a fungus which is infected with virus particles containing double-stranded ribonucleic acid, which process comprises contacting fungal cells of opposite mating types or contacting opposite gametes with virus particles containing double-stranded ribonucleic acid thereby infecting at least some of the resultant zygotes with said virus particles, and thereafter cultivating the infected zygotes to produce a fungus which is infected with said virus particles.

Although it is possible to take two cells of opposite mating types, or two morphologically differentiated or undifferentiated gametes, and to contact them with virus particles in accordance with this invention, we prefer, for reasons of convenience to contact the fungal cells of a live colony containing cells of opposite mating types, or differentiated or undifferentiated gametes, with virus particles. When this more convenient method is used a growing colony of the desired host fungus is first prepared. This may be achieved by mixing fungal cells of two separate colonies of opposite mating types on or in a suitable culture medium. Alternatively, a wild or mutant fungus which already contains cells of opposite mating types can be used.

The cells of the growing colony are then contacted with virus particles. This is usually done in a liquid culture medium containing the growing fungal cells, to which is added a suspension of the virus particles in the same culture medium or in a different liquid medium which does not adversely affect the growth of or the fungus or at least the mating process e.g. distilled water containing phosphate buffer (pH about 7). In order to ensure a high rate of infection, we prefer to use a high density suspension of virus particles. The resultant mixture of fungal cells and virus particles in culture medium is then incubated for a period of time from a few minutes to several days, to ensure infection during the formation of at least some of the zygotes produced by mating cells or mating gametes. Generally it will be sufficient to incubate the fungal cell/virus particle mixture at room temperature for a few hours. At the end of the infection period, the next step in the process of this invention is the cultivation of infected zygotes.

After the infection stage, the fungal cells (which of course include the infected zygotes) may be collected by centrifugation and resuspended in distilled water. If desired, the centrifugation and resuspension may be repeated to wash the cells free of free virus particles. At the infection stage, it is extremely unlikely that all the zygotes produced by mating in the presence of virus particles will be infected. Thus, the fungal cells obtained after the infection stage comprise uninfected unmated cells or gametes, uninfected zygotes and infected zygotes. Clearly, any large scale preparation of virus particles from such a cell mixture would be relatively inefficient. Thus, we prefer to isolate the infected zygotes from the cell mixture produced after the infection stage, and to grow colonies from these infected zygotes. The problem then is to isolate the infected zygotes from the cell mixture.

This may be done by taking the cell mixture obtained after the infection stage, plating a sample of the cell mixture onto a culture medium, allowing single cell plates to grow into a cell colony, and examining samples of the resultant cell colonies by electron microscopy to locate the infected colonies (i.e. those which have resulted from infected zygotes). This technique is, however, somewhat laborious, and some more convenient method would be desirable.

The dye, methylene blue, has the useful property of staining dead fungal cells, but leaving live cells untouched. We have noted that when colonies of infected zygotes are grown on a culture medium containing methylene blue, a proportion of the colonies show a central zone of dead cells, stained blue by the dye. This observation leads to a convenient method for the identification of infected zygotes in certain special cases. The general technique in such cases is as follows:

In some instances, opposite mating types of a fungus are separately unable to produce some essential nutrient, but after mating, the resulting zygotes and their offspring can produce the essential nutrient. Thus if a fungus of this type is infected by the process of this invention, and the resulting cell mixture is plated on a medium lacking the essential nutrient, only zygotes and their offspring will survive. If that medium also contains methylene blue dye, a proportion of the colonies resulting from *infected* zygotes will have a central zone of dead cells, probably killed by the virus, and stained blue by the dye. Platings of these "blue" colonies can be made onto a fresh culture medium and the resulting colonies will contain a very high concentration of virus particles. This procedure can be repeated as many times as is necessary to allow the selection of a blue colony which, on growth and re-plating, *consistently* gives rise to the highest proportion of blue colonies. The chosen colony is multiplied to serve as a stock colony from which a commercial-scale preparation of infected fungus can be made.

Although the procedure described above is a special one, it should be emphasised that an analogous procedure can be followed when electron microscopy is used to locate infected colonies resulting from infected zygotes after the initial infection stage in accordance with this invention. Thus, stock cultures would be made from colonies which, on repeated sub-culture, consistently indicated high concentrations of virus particles under examination by electron microscopy.

Similarly, gel electrophoresis assay of the concentration of virus particles produced by a colony could also be used to select the best colonies for stock cultures.

This invention is applicable to a fungus which reproduces at least in part by fusion of cells of opposite mating types or by fusion of gametes.

Among the Ascomycetes the yeasts are an example of a group of fungi which reproduce at least in part by fusion of cells of opposite mating types. However, by far the majority of fungi classified as Ascomycetes reproduce partly by fusion of morphologically differentiated or undifferentiated gametes. Among the Phycomycetes, the aquatic fungi classified as Saprolegniales also reproduce partly by fusion of gametes as do the terrestrial fungi classified as Mucorales and Peronosporales.

This invention allows a previously uninfected strain to be infected with d.s. RNA virus particles. Thus by a suitable choice of host fungus, the commercial yields of virus particles can be maximised. In addition, virus particles containing a particularly preferred species of d.s. RNA can be grown in the desired host, irrespective of whether the host can be found in nature infected with such virus particles. By way of illustration, virus particles isolated from a member of the species *Penicillium* or *Aspergillus* could be grown in a yeast. The following examples illustrate this invention:

EXAMPLE 1

Infection of mating pairs of *Saccharomyces cerevisiae* with double-stranded RNA viruses from *Aspergillus niger* and *Penicillium funiculosum*

Suspensions of double-stranded RNA virus obtained from *A. niger* strain IMI 146891 and *P. funiculosum* strain IMI 163167 were prepared. Each suspension was in water containing phosphate buffer (pH 7.2) and contained about $10^9$ particles/ml. Two adenine-requiring strains of *S. cerevisiae* were used: ad-1 α and ad-2.1 a (described in Woods, D. R., and Bevan, E. A., *J. gen Microbiol.*, 51, 115 (1968) and Somers, J. M., and Bevan, E. A., *Genet. Res., Camb.*, 13, 71 (1969)). All media have been described in Somers, J. M., and Bevan, E. A., *Genet. Res., Camb.*, 13, 71 (1969). Incubation was carried out at 28°. Infection was achieved by mixing on agar complete medium pH 5.8 (ACM) one loopful of each mating type and by adding to the mixture 0.01 ml. of virus suspension ($10^9$ particles/ml.). The plates were incubated for 3 hours, after which the cells were collected and washed twice by centrifugation (800 g.) and resuspension in distilled water. Platings were made on methylene blue complete (MBCM) or minimal medium (MBMM) pH 5.8 to recover respectively zygotes and unmated cells or, as the *ad* markers are complementary, zygotes alone. After a fortnight incubation, 1–5% of the colonies developing from the zygotes showed a dark-blue central zone of dead cells. These colonies will be referred to as blue, as opposed to the normal white diploid colonies. Five of them were plated on MBCM. Blue colonies always developed, but their proportion varied from 10 to 70%. From these, three successive single cell isolations were made and, in each plating, more than 95% of the colonies were blue. Virus suspensions were prepared from 3 blue colonies of each plating and tested by gel electrophoresis and electron microscopy. Viruses were found in all. Twenty white diploid colonies tested were virus-free. One of the infected diploids was grown on ACM and thin sections were prepared for electron microscopy. Many particles were found in the cytoplasm of the cells.

EXAMPLE 2

Infection of mating pairs of *Saccharomyces cerevisiae* with double-stranded RNA viruses from *Penicillium chrysogenum* and *P. stoloniferum*

Suspensions of virus were prepared from *P. stoloniferum* ATCC 14586 and from *P. chrysogenum* ATC 10111 as in Example 1. Two strains of *S. cerevisiae* were used: $ad_1$ -α and wild type "a." The infection procedure was as in Example 1. But, in this instance, on plating on MBMM the haploid wild type "a" strain (white) was recovered as well as the white diploid colonies and the blue diploid colonies. Colonies developing from zygotes are slightly larger than those arising from haploid cells and with experience can be distinguished. After incubation for two weeks 1–5% of the colonies developing from the zygotes were "blue" colonies. Five blue colonies were plated on MBCM and three successive single cell isolations were made as before. Viruses were again found only in blue colonies.

The number of haploid wild type "a" colonies growing up on the MBMM dilution plates (i.e. after plating the resuspension of cells following mating) can be reduced, if necessary, by using a considerable excess, say 10-fold, of the marked (nutritionally deficient) haploid strain. Thus, the wild type is diluted out earlier in serial dilutions on the MBMM plates.

DISCUSSION

It is hypothesised that mating is necessary for infection and this is supported by two observations. In platings on MBCM, the unmated parental cells do not show the central zone of dead cells, which is observed in haploids after sporulation of an infected diploid. Furthermore, 5 zygotes obtained from mating in absence of virus were grown in presence of virus in the conditions under which the mating pairs had been infected. No blue colony was recovered. From each zygote, 5 colonies selected at random after plating were tested for virus and found virus-free.

The data already available give some indications as to how infection of mating pairs may occur. The small percentage of infected zygotes and the variable proportion of infected cells developing from newly infected zygotes indicate that a few particles only enter the pairs, possibly when part of the cell wall on which they had adsorbed breaks down during mating. A number of cells budded off soon after mating will not receive virus particles, but in each infected cell the number of particles will finally reach the level inducing the death of the cell.

I claim:

1. A process for the preparation of a fungus which is infected with a double-stranded ribonucleic acid virus, which process comprises contacting fungal cells of opposite mating types with double-stranded ribonucleic acid virus particles of fungal origin, thereby infecting at least some of the resultant zygotes with said virus particles, and thereafter cultivating the infected zygotes to produce a fungus which is infected with said virus particles.

2. A process as claimed in claim 1 wherein after contacting the fungal cells of opposite mating types with the virus particles, a plurality of separate fungal colonies are grown, a majority of said colonies each being derived from a single zygote cell, and one or more of the resultant colonies which are found to be infected with virus particles is further cultivated to produce additional infected fungus.

3. A process as claimed in claim 1 wherein the fungal cells of opposite mating types are yeast cells.

4. A process for the preparation of a fungus which is infected with a double-stranded ribonucleic acid virus, which process comprises contacting fungal cells of opposite gametes with double-stranded ribonucleic acid virus particles of fungal origin, thereby infecting at least some of the resultant zygotes with said virus particles, and thereafter cultivating the infected zygotes to produce a fungus which is infected with said virus particles.

No references cited.

RICHARD L. HUFF, Primary Examiner